March 3, 1942.         W. J. GRAY         2,274,785
DUCT JOINT
Filed March 28, 1941         2 Sheets-Sheet 1
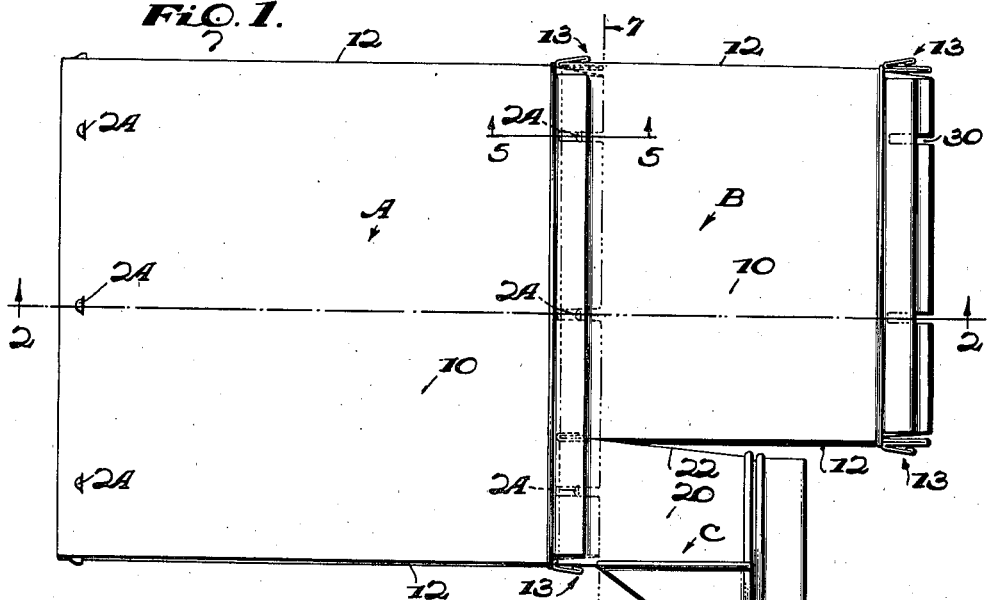
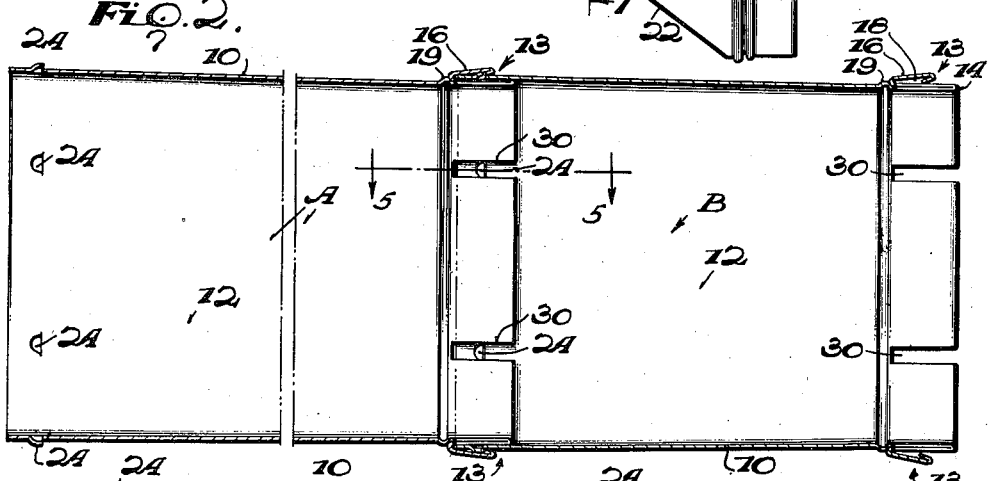
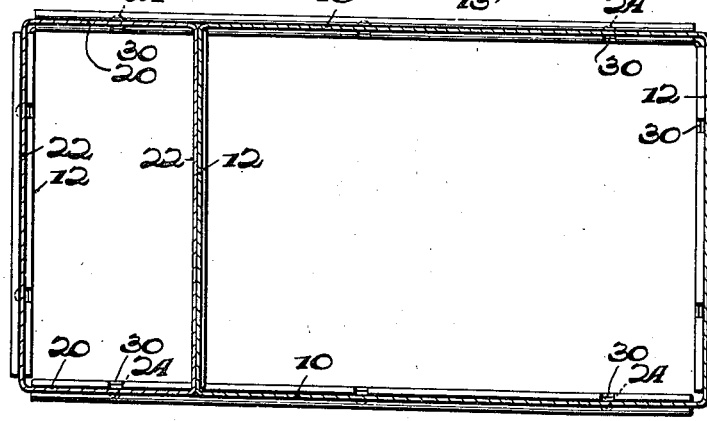
Inventor
William J. Gray
By
Attorney March 3, 1942.  W. J. GRAY  2,274,785
DUCT JOINT
Filed March 28, 1941  2 Sheets-Sheet 2
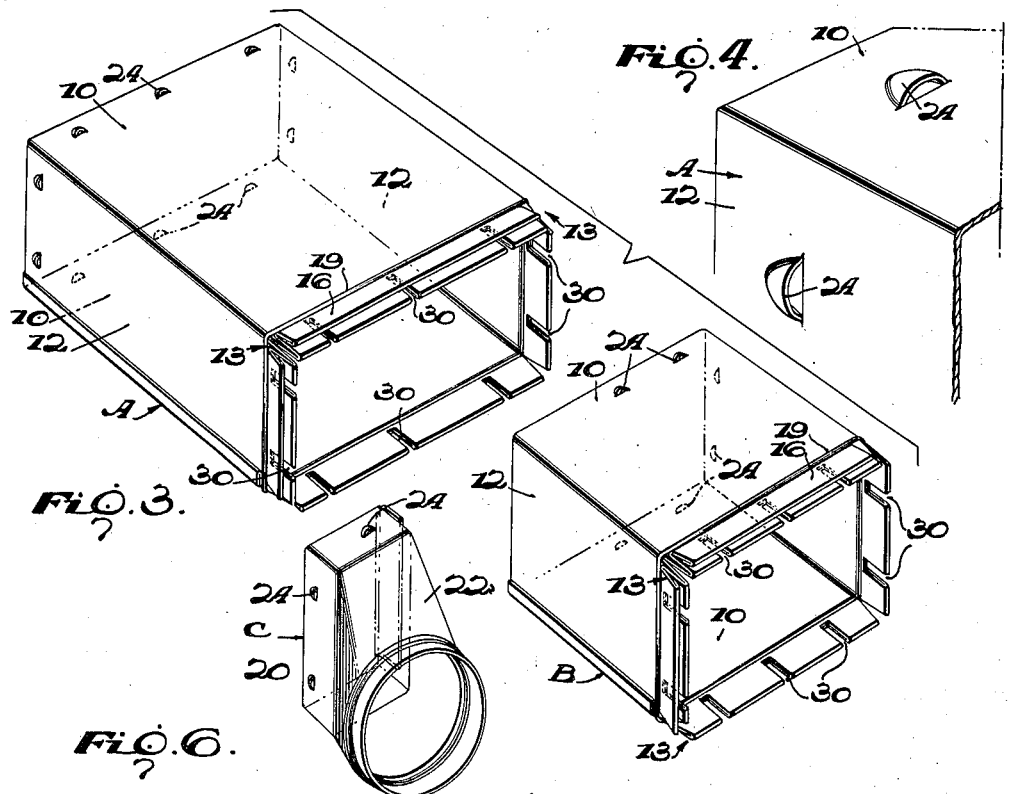
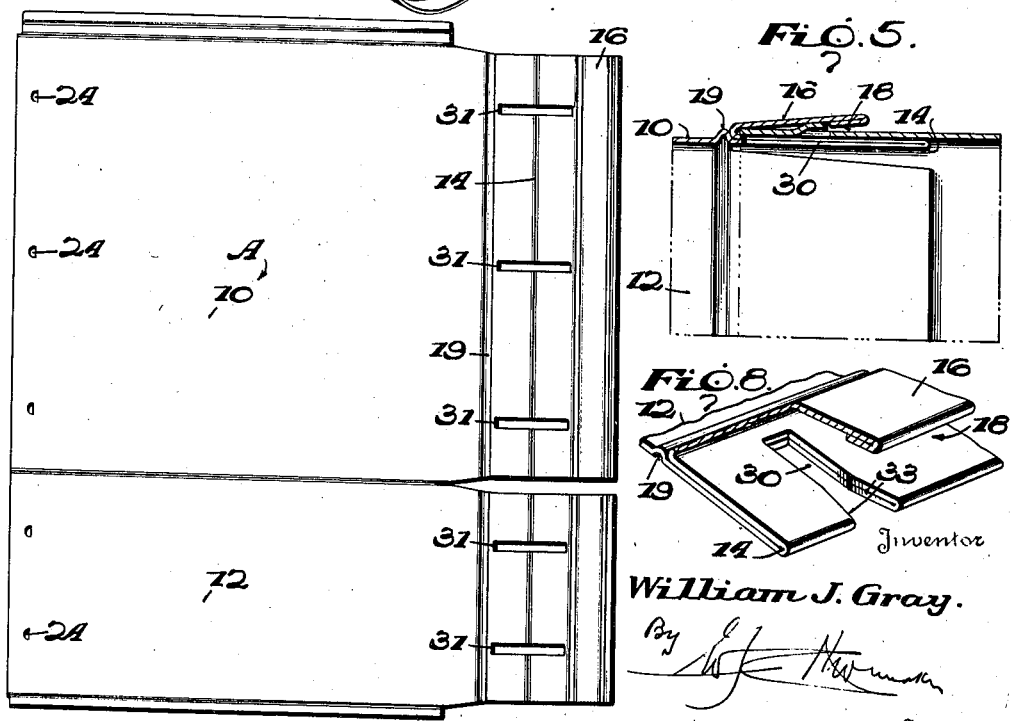
Inventor
William J. Gray.
By
Attorney Patented Mar. 3, 1942

2,274,785

UNITED STATES PATENT OFFICE 2,274,785

DUCT JOINT

William J. Gray, Rochester, N. Y., assignor to Gray Metal Products, Inc., Rochester, N. Y., a corporation of New York Application March 28, 1941, Serial No. 385,744

1 Claim. (Cl. 285—201)

The improved duct joint comprising the present invention is primarily adapted for use in connection with warm air heating and air conditioning installations. The principles of the invention, however, are applicable to other uses and the present duct joint may be employed in connection with all manner of furnace and stove pipes, air ducts and tunnels, etc., particularly where the installations are comprised of sheet metal.

In installations of this character, where a branch is made from a main trunk line, many difficulties are encountered in making the mounting and in providing an air tight joint at the location of the branch. This is particularly true where the branch or take-off is made at the end of a conduit section and a corresponding reduction in the size of the main trunk line is effected, or where several branches or take-off connections are made at the ultimate end of the main trunk line.

In such an instance it has been customary, where installations are made on the job, for the workman to pry the usual external locking cleat provided at the end of each trunk line conduit section outwardly and notch the inner rim of the section at the proper place to provide a clearance for the adjacent rim portions of the branch conduit and reduced trunk line section. Such a method of installation is unsatisfactory, first, in that after the locking cleat has once been bent out of its normal plane it is difficult to again restore it to its original position. Even in an instance where the operator is able to reach the length of the section with a dolly bar to reinforce the locking cleat, the locking cleat cannot be effectively restored to its original position and the resultant joint is frequently unsightly and not air-tight. Secondly, unless the locking cleat is bent outwardly at ninety degrees or more from its normal position, the operator is unable to reach with his shears the bottom of the U-shaped retaining pocket or seat provided between the cleat and body of the conduit section and as a consequence the notch thus formed in the installation process is not sufficiently deep to accommodate the edges or rim portions of the branch and reduced trunk line conduit sections.

The present invention is designed to overcome the above noted limitations that are attendant upon the use of present day conventional warm air and air conditioning system installations and toward this end contemplates the provision of preformed units which may be quickly and easily assembled on the job in a very secure manner and without the use of tools. Installations made according to the present invention require no bending of the usual locking cleat, and when assembled, are entirely air-tight and rigid and present no visible evidence of the pre-notching operations resorted to in the manufacture of the units. Furthermore, such installations may be made by unskilled operators with very little or no opportunity for improper assembly of the various parts.

In general the objects of the present invention are to provide an installation of the character set forth above which may be built up on the job according to the various requirements and conditions imposed by the particular job, and to provide an installation consisting of preformed units which may be constructed according to standard sizes, the units being capable of being fitted together in several different ways and in such a manner that the entire installation is easy to balance.

It is a specific object of the present invention to provide a duct joint construction of this nature which is slotted for the purpose of interfitting various sections together while at the same time making provision for rendering the various joints air-tight.

Yet another object of the invention is to provide a duct joint which is extremely rigid and which, when employed in an installation, lends rigidity to the entire duct.

The provision of an installation of this character which is possessed of no pivoted or other parts which are movable relative to each other, at least as far as the locking feature is concerned; one which is rugged in its design and which consequently is unlikely to get out of order; one which is inexpensive to manufacture; and one which is well adapted to perform the services required of it, are further desirable features that have been borne in mind in the production and development of the present invention.

In the accompanying drawings, forming a part of this specification:

Figure 1 is a fragmentary side elevational view partly in section of an air-duct installation manufactured and assembled according to the principles of the present invention.

Figure 2 is a sectional view taken substantially along the line 2—2 of Figure 1.

Figure 3 is an expanded perspective view of the assembly shown in Figure 1.

Figure 4 is a fragmentary perspective view partly in section of a conduit or duct section illustrating certain locking features employed in connection with the invention.

Figure 5 is a sectional view taken substantially along the line 5—5 of Figure 2.

Figure 6 is a fragmentary plan view of a blank from which one of the units comprising the present invention is formed, and Figure 7 is a sectional view taken substantially along the line 7—7 of Figure 1.

Figure 8 is an enlarged fragmentary view of a conduit section showing a modified form of slot therein.

In all of the above described views, like characters of reference are employed to designate like parts throughout.

Referring now to Figures 1 and 2, the main trunk line or distributor duct sections A and B each includes longitudinal and transverse walls 10 and 12 which, at one end of the section are formed with generally S-shaped seams 13 that are formed by first bending the margins of the walls during formation of the section from its blank as at 14 (Figure 5) to provide a locking bead; then bending the outer edge regions of the walls back upon themselves to provide a cleat portion 16; then imparting to the walls a reverse bend so that a U-shaped pocket 18 is provided into which the adjacent edges of one or more main or branch line ducts or units such as the adapter boot C may be inserted as will be described presently; and finally forming a rib 19 coextensively with the seam adjacent the inner edge thereof.

In Figure 1, the adjacent edges of three walls 10, 10, 12 of the main trunk line section B are inserted into the respective pockets 18 of the trunk line section A, while at the same time the adjacent edges of two longitudinal walls 20, 20 and one transverse wall 22 of the adapter boot C are inserted into their respective pockets 18 with the inner transverse walls 12, 22 of the sections B and C respectively occupying positions in substantial contiguity.

A plurality of locking protuberances 24 are formed on the various walls of the sections B and C adjacent the juncture with the section A and are adapted to extend behind the locking bead as shown in Figure 2 so that once the sections are assembled they are locked in position. The locking beads may be formed by a stamping and pressing operation on the metal of the walls of the various sections.

In order to accommodate the adjacent and contiguous transverse edges of the walls 12 and 22, a pair of opposed open-ended slots 30 are provided through the two inner folds of the longitudinal seams of the section A, the slots extending from the rim of the section A to the bottom of the pockets 18 adjacent the rib 19.

In constructing the sections A, B and C or other units such as angle pieces, elbows, damper sections, register sections and the like, a plurality of pairs of the slots 30 are formed in the seams in order to accommodate the engineering requirements of various types of installations. The blank (see Figure 6) is formed with elongated openings 31 so that the various pairs of opposed composite slots will occur in the completed unit at spaced regions which are standard distances removed from the corners of the units. For example, these slots 30 may be provided both in the longitudinal walls and in transverse walls of the units at 4, 8 and 12 inch distances inward from the corners of the larger sizes of main trunk line sections. For intermediate size trunk line conduit sections the slots 30 may be formed at 4 and 8 inch distances inward from the corners, while for small sizes of main trunk line conduit sections 2 and 4 inch distances may be employed. Irrespective, however, of these details in the manufacture of the units however, the essential features of the invention are at all times preserved.

The various slots 30 may have straight parallel opposed edges if desired. However, I may widen the medial regions of the openings 31 in the blank so that upon folding the metal to provide the locking seam 13, the outer portions of the composite slots 30 will have diverging edges as at 33 thus providing a guiding means, as shown in Fig. 8.

It is to be noted that the operator who assembles the various sections in an installation is not required to utilize any tools whatsoever providing the requisite number of slots 30 and their spacing is taken care of in the preforming of the seams 13.

Furthermore, the various slots 30, being accurately spaced in the preforming of the sections, afford a measure of distance and thus the operator finds it not only unnecessary to utilize tools in the installation of the parts but he is not even required to utilize a measuring rule.

It will also be seen that any tendency for the various units to be weakened by the formation of the slots 30 therein is more than overshadowed by the provision of the rib 19 along the inner edge of the seam 13. While this rib 19 is not large, it is extremely effective in that it reinforces the inner edge of the folded portion of the seam and lends rigidity to the seam as well as lending rigidity to the body portion of the unit. Furthermore, the rib 19 in effect closes the seam at its inner edge and effectively serves to prevent ingress or egress of air through the seam at the regions of the slots. In the assembled and unassembled form, the units present an attractive appearance and the seam covers and conceals the inner ends of the slots from view.

It might be noted that if attempt is made to cut V-slots at the four corners of a take-off section to position it on an adjacent section the apices of the slots might extend beyond the locking cleat, causing not only an unsightly appearance but the formation of holes permitting ingress and egress of air and therefore by proper spacing of the slots in the various sections as specified the latter may be readily positioned without the use of tools at the job and without mutilating the locking cleat or through negligence or otherwise form unsightly openings permitting escape of air from the made up conduit.

The invention is not to be limited to the exact arrangement of parts disclosed in the accompanying drawings or described in this specification as modifications may be resorted to within the spirit of the appended claim.

What is claimed is:

An open-ended sheet metal conduit section of rectilinear configuration in cross-section, the walls of said section each having a reverse bend at its edge portion providing an outer locking cleat and an inner double wall reinforced edge portion, said cleats and edge portions forming therebetween pockets adapted to receive therein the walls of adjacent conductor sections in an assembly installation, there being a pair of opposed slots in at least one opposed pair of walls in the reinforced edge portions thereof and extending inwardly from the edges of said walls and terminating adjacent said double wall reinforced inner edge portion, and a rib formed in each wall coextensive with said inner double wall edge portion and in engagement with the latter and serving to substantially seal the inner edges of said pockets.

WILLIAM J. GRAY.